Sept. 18, 1956      R. A. LONG ET AL      2,763,149
HYDRAULIC TENSILE TESTING APPARATUS FOR MATERIAL
Filed Nov. 23, 1953      2 Sheets-Sheet 1
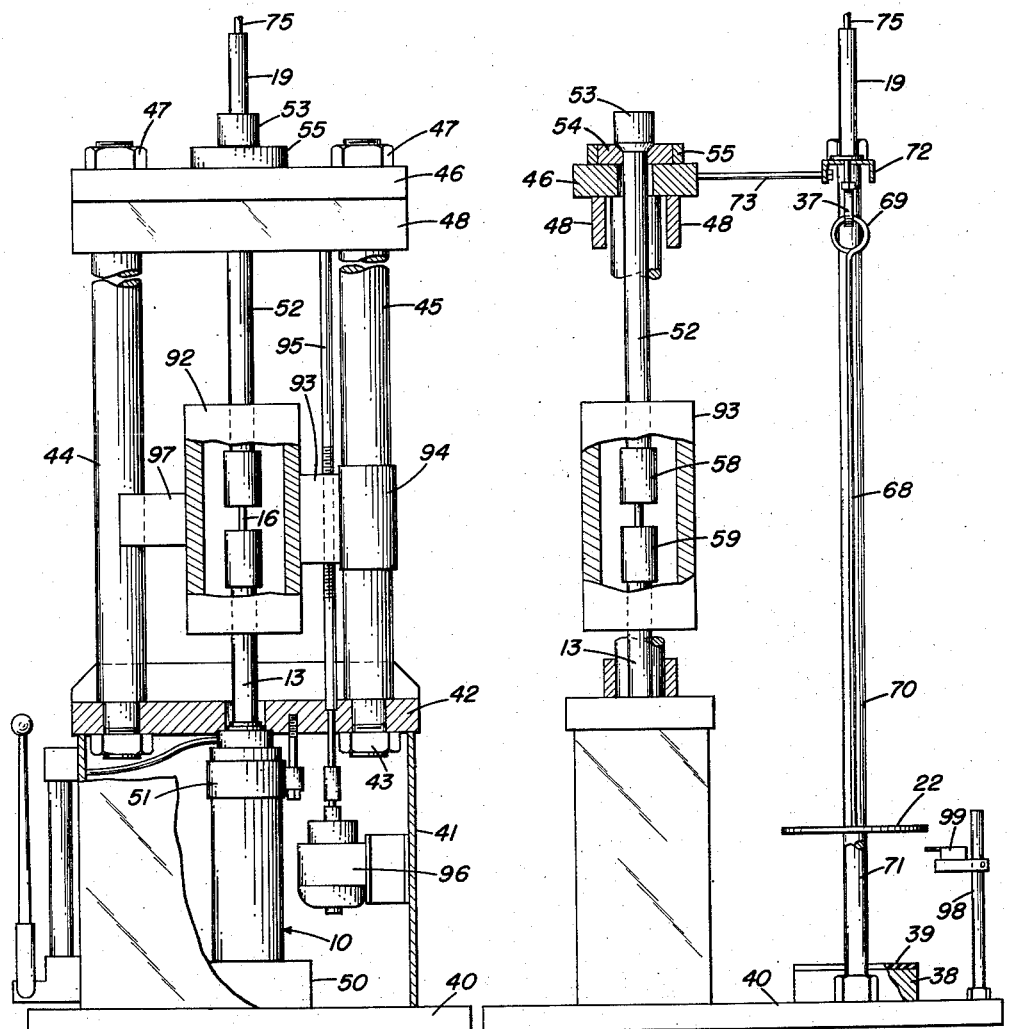
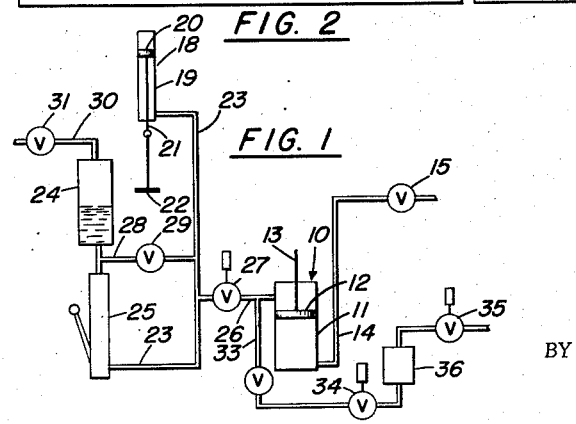
INVENTORS
ROGER A. LONG
MAX B. STRAUSS
BY
ATTORNEYS Sept. 18, 1956     R. A. LONG ET AL     2,763,149

HYDRAULIC TENSILE TESTING APPARATUS FOR MATERIAL

Filed Nov. 23, 1953     2 Sheets-Sheet 2

INVENTORS
ROGER A. LONG
MAX B. STRAUSS

BY

ATTORNEYS

United States Patent Office 2,763,149
Patented Sept. 18, 1956

2,763,149

HYDRAULIC TENSILE TESTING APPARATUS FOR MATERIAL

Roger A. Long, Bay Village, and Max B. Strauss, South Euclid, Ohio

Application November 23, 1953, Serial No. 393,974

2 Claims. (Cl. 73—15.6)

(Granted under Title 35, U. S. Code (1952), sec. 266)

The invention described herein may be manufactured and used by or for the Government of the United States of America for governmental purposes without the payment of any royalties thereon or therefor.

This invention relates to testing apparatus of the hydraulic type for determination of rupture, creep and fatigue values for various construction materials.

In prior art equipment employed for rupture, creep and fatigue determinations difficulties have developed in maintenance of constant load on the workpiece and alinement of the workpiece with the applied stresses, resulting in improper functioning and inaccurate determinations.

It is, accordingly, an important object of this invention to provide apparatus insuring elimination of bending stresses in the workpiece during test.

An object also is to insure constant loads over long time periods.

Other objects include elimination of static friction between the piston and cylinder of the control unit; simplification of measurement methods; and improvement in workpiece grip construction.

Additional objects and advantages will appear on reference to the following detailed description and accompanying drawings in which:

Fig. 1 is a diagram of the hydraulic system used;

Fig. 2 is a front elevation, partly in section of the main pump unit and workpiece supports;

Fig. 3 is a side view of the apparatus including the control pump;

Figure 4:
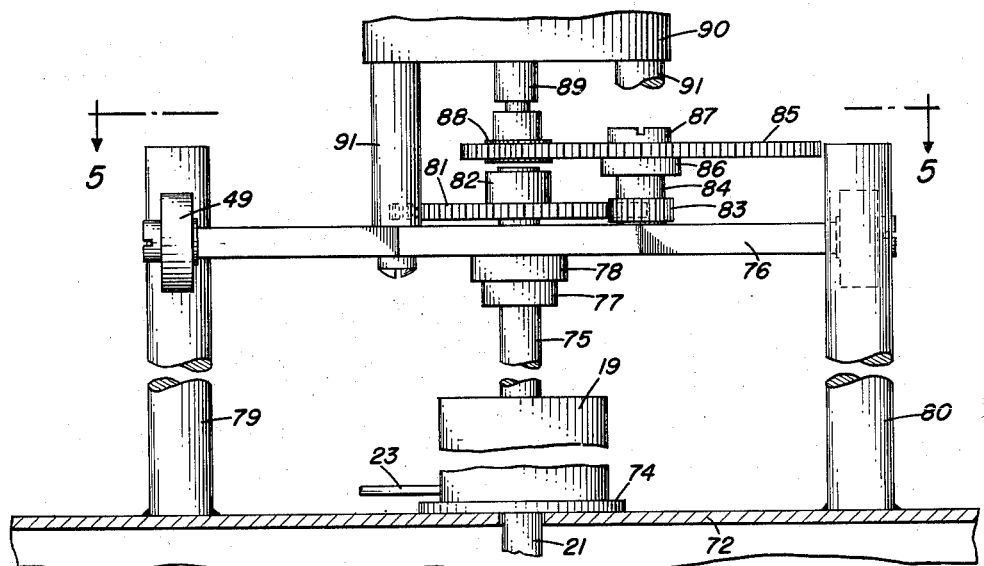
Fig. 4 shows the power mechanism for rotating the piston of the control pump.
Figure 5:
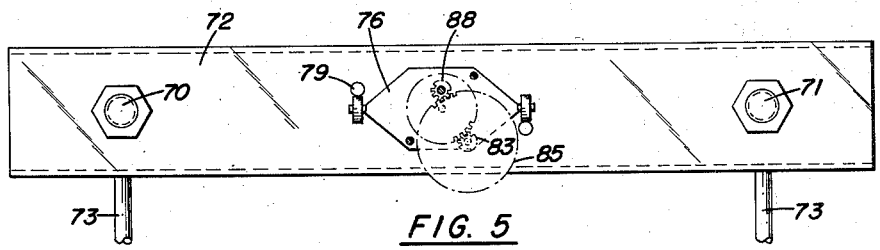
Fig. 5 is a view of the mechanism as taken along line 5—5 of Fig. 4.

Reference will first be made to the general hydraulic system as indicated in Fig. 1 for an understanding of the disclosure. In this figure the main hydraulic unit is indicated by numeral 10, this unit including the cylinder 11 and piston 12 reciprocable therein. Piston rod 13 is attachable to the specimen for force application thereto.

The space in cylinder 11 below piston 12 is adapted for reception of compressed air through pipe 14 and hand valve 15 in order to lift the piston for attachment to the specimen.

The control unit 18 includes the cylinder 19, piston 20 and depending piston rod 21. The weight pan 22 is attached to the external end of the piston rod. The space in cylinder 19 below the piston is adapted to hold transmission fluid, such as oil, and this is supplied by means of pipe 23 from reservoir 24, hand pump 25 serving to force the oil into the control pump cylinder. As shown in Fig. 1, the diameter of the control cylinder 19 is substantially less than that of the main cylinder 11.

Oil is also supplied to main unit 10 above the piston from reservoir 24, by means of pipes 23 and 26, a solenoid valve 27 controlling the oil flow. Connection between the reservoir and pipe 23 is also made by cross pipe 28 between the reservoir and pipe 23. Valve 29 is included in pipe 28. To aid oil flow, compressed air is led into the upper space of the reservoir through pipe 30 and valve 31.

In order to include fatigue tests on the specimen where desirable, pipe 26 between valve 27 and cylinder 11 is tapped by pipe 33 and connection made to a source of compressed air through solenoid valves 34 and 35 and diaphragm unit 36.

With the apparatus as above described it will appear that with main power unit piston rod 13 attached to a specimen for tension and with pipe line 23—26 and the connecting control and power unit cylinder spaces oil filled for power transmission, the placement of weights on weight pan 22 of the control unit 18 will transmit pressure to the power unit piston multiplied by the piston area ratio of the two units, valve 27 being open, and valves 29 and 34 being closed. It will also appear that by closing valves 27 and 29 and operating the hand pump 25, oil will be forced into cylinder 19 of control unit 18 to lift the piston 20 for pre-test positioning. Also, piston 12 of the power unit may be raised for specimen attachment by operation of air valve 15. Where fatigue tests are made fluctuating pressure is applied to the diaphragm of unit 36 with solenoid valves 27, 34 and 35 under the control of appropriate timing mechanism, pressure having previously been applied to piston 12 of the power unit.

The apparatus will now be considered primarily from the viewpoint of structure. On the base platform 40 a four sided casing 41 is erected having a covering plate 42. Extending upwardly from opposite sides of this plate, and secured thereto as by nuts 43, are two support rods 44 and 45, bridged at the top ends by a top cross bar 46. Nuts 47 secure this top plate to the threaded ends of the rods 44, 45. Flat bars 48 are welded at one edge beneath opposite sides of the cross plate to increase resistance to tensile stresses.

The specimen support and power mechanism for specimen treatment are mounted midway in the frame of rods 44—45, the power unit 10 being placed in casing 41 on a suitable base 50 with side retaining clamps 51 fastened to plate 42. The piston rod 13 extends upwardly through an opening in the plate 42 to a suitable point for specimen attachment. The stationary mating rod 52 for specimen attachment passes through an opening in cross bar 46 and terminates in a head 53 spherically curved on the under enlarged surface to form a ball and socket connection with socket 54. This socket is in the form of a circular plate, centrally apertured and curved to form a coacting surface for the curved area on head 53. A ring 55, secured to the plate 46, holds the socket in place.

Figure 6:
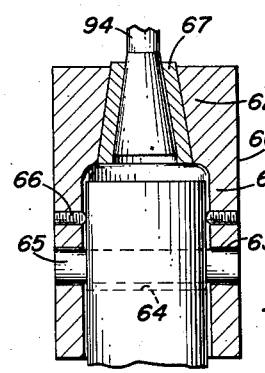
Fig. 6 is a detail showing the workpiece grip device.

The adjoining ends of specimen support rod 52 and piston rod 13 are provided with terminal specimen grips 58 and 59 of the type as shown in Fig. 6. These grips take the form of a cylindrical block 60, tubulated axially to form a cavity with two inner sections, one section 61 having a curved surface corresponding to the rod end curvature but of increased diameter and the other section 62 having a frusto-conical surface convergent toward the end. The first mentioned section is formed with alined wall openings 63 which are adapted to register with a transverse bore 64 through the adjoining grip support. The bore 64 is of larger diameter than the tube opening 63 so that when retaining pin 65 is fixedly secured in openings 63 through the bore 64 of the support, the support has a degree of play to permit adjustment to the tensile stresses of the mechanism. After initial alinement with reduced force, the set screws 66 placed at 90° intervals around the grip, are tightened.

An outstanding problem in rupture test machines is prevention of specimen breakage due to misalinement, this problem being particularly prominent when ceramic type specimens are being investigated. Fig. 6 illustrates a satisfactory gripping structure involving the formation of the specimen 16 with divergent conical ends corresponding in angle to the convergent inner surface 62 of the grip 60 and inserting a collet 67, tapered similarly to the conical surfaces of the grip section 62 and the specimen end, between the grip and specimen. A taper of the specimen ends and grip surface 62 of around 10° has been found satisfactory. The collet 67 preferably is of the axially split type and is of material deformable under the working load, such as aluminum, brass, bronze, tin or other deformable metal, alloy or composition, the choice of material being dependent on the load and temperature of test.

Thus, it is evident that when tension is applied to the inserted specimen there will be a deformation of the collet to aline the specimen in exact line with the direction of applied tension.

It is important to note that the specimen can be readily removed without breakage so that no disturbance of the fractured surfaces takes place. This is of particular value with ceramic specimens.

An electrical resistance heating unit in the shape of a cylindrical drum 92 is adapted to enclose the grips 58, 59 and the specimen 16 so that specimen rupture or creep tests at any desired temperature may be made. The drum is supported on slidably mounted rod 45 by a web 93 and a sleeve 94, the web having an internally threaded nut fixed thereto and movable on vertical screw shaft 95. Shaft 95 is rotated by reversible motor 96 mounted on the base casing 41. An auxiliary guide yoke 97 may be used also. By operating the motor 96 it is apparent that the heating drum 92 may be lifted or lowered as desired.

The control unit 18 for operating the main power unit 10 is mounted on base 40 behind the main unit supporting frame. Two supporting posts 70 and 71 of approximately equal height with main unit rods 44, 45 are bridged at the top by channel plate 72, and spacer brace 73 is attached between this plate and cross bar 46 on the main frame.

Centrally on plate 72 between the support rods is mounted the control unit 18. This unit includes the cylinder 19 mounted on base plate 74, piston 20 (see Fig. 1), and piston rod 21 depending from piston and cylinder through openings in plates 74 and 72. Piston rod 21, terminates in an eye link 37, and the weight pan 22 is suspended from this link by rod 68, and engaging ring 69. Directly beneath the weight pan 22 on platform 40 is a raised buffer plate 38 on which a rubber mat 39 is secured.

To indicate time from load application to rupture of a specimen, a post 98 having an electric circuit-micro-switch 99 slidable thereon is mounted on base 40 in such relation to the posts 70—71 that pan 22, in falling to buffer mat 39 after specimen rupture, will actuate the micro-switch and thus produce an indication on the timer (not shown) connected to the micro-switch. This timer is of ordinary type and is set to measure time when the pan load is applied.

Extending centrally above the control piston and attached thereto is another rod 75 adapted for connection to a motor for securing a slow rotation of the piston 20 to eliminate static friction. To accomplish this end a small platen 76 is mounted on rod 75 using thrust collar 77 attached to rod 75 and thrust bearing 78 fixed to platen 76, the platen extending between roller posts 79 and 80. These posts are placed one on each side of top piston rod 75 and fixed to cross plate 72. The platen adjacent these posts is converged to form pointed ends at each of which a roller 49 is mounted to rotate in a plane perpendicular to the platen plane. Each roller engages one post so that on up and down movement of the control piston the rollers ride on the contacting posts, the torque of the piston holding the rollers against the post.

The piston rod 75 extends through the platen 76 and just above the platen, carries a gear wheel 81, the collar 82 at the rod end holding the gear in place. Gear 81 engages a pinion 83 fixed to and rotatable with stub shaft 84, the latter being vertically mounted on the platen. The top end of this stub shaft carries a gear wheel 85 suitably fixed thereto by collar 86 and screw 87, and this wheel, in turn, engages a pinion 88 fixed on the lower end of the shaft 89 depending from motor 90. Rod supports 91 fastened to the motor casing and platen 76 hold the motor pinion 88 in proper spaced portion for engagement with gear 85. When the motor is energized rotative power is transferred to the piston at a speed reduction to produce a piston rotation of about one revolution in forty-five minutes. By this rotation a load constancy on the specimen within 1% is obtained.

Reviewing the operation, to determine rupture value the specimen, fashioned to the desired form with reversed frusto-conical ends, is inserted in the grips at the ends of the tension rods 13 and 52, the rod 13 being susceptible of vertical adjustment by air valve 15. If a set temperature of test is required the furnace 92 is moved to enclose the specimen and set for the required heat.

The desired load is then placed on pan 22 and the timer set to mark the beginning of the test period. At specimen rupture the timer is actuated by micro-switch 99 to obtain the time registration.

Where creep measurement is sought the distance of movement of the control piston from the time of load application for a given test period is observed and this distance divided by a factor representing the mechanical advantage of the machine.

The described structure produces satisfactory results; but, obviously, changes may be made in the various structural elements to meet different requirements. Particularly, different arrangements and forms of the grip structure may be made to suit specific needs. Hence no limitation is implied by the specific description other than may be required by the claims as hereinafter set forth.

What is claimed is:

1. A material testing machine, comprising grips for engaging the specimen to be tested; a first base for said machine; a first frame mounted on said base for supporting the machine thereon; a stationary member fixed to said frame and to one of said grips, a hydraulic unit fixed to said frame including a cylinder, a movable piston in said cylinder and a piston rod attached to said piston, another of said grips being fixed to and movable with said piston rod in alinement with said one grip; hydraulic control means for controlling the hydraulic pressure transmitted to the piston of said hydraulic unit, including a second frame, a second base for supporting said second frame, a cylinder fixed to said second frame, a piston movable in said cylinder, a rod attached to said piston, and a weight support attached to said rod; a pipe connection between the weight support end of said control means cylinder and the grip attachment end of said hydraulic unit cylinder for transmission of fluid pressure therebetween, the diameter of the control means cylinder being less than that of the hydraulic unit cylinder; and friction reducing means for said hydraulic control means comprising a motor having a casing and a power shaft adapted for placement in coaxial alinement with said control means piston, a fixed collar support on said control means piston rod positioned externally of the control means cylinder, a platen having projecting ends rotatably mounted on said control means piston rod and supported by said collar, rods between said motor casing and platen for supporting said motor casing for movement with said platen, driving connections between said motor shaft and control means piston rod, two posts fixed on the frame of said control means on opposed sides of the control means cylinder and in parallel relation thereto, and single rollers attached to said platen ends and adapted to engage said posts in response to torque exerted by said motor for movement along said posts in parallel with said control means piston on movement of said piston in said control cylinder.

2. A material testing machine, comprising grips for engaging the specimen to be tested; a first base for said machine; a first frame mounted on said base for supporting the machine thereon; a stationary member fixed to said frame and to one of said grips; a hydraulic unit fixed to said frame including a cylinder; a movable piston in said cylinder and a piston rod attached to said piston, another of said grips being fixed to and movable with said piston rod in alinement with said one grip; hydraulic control means for controlling the hydraulic pressure transmitted to the piston of said hydraulic unit, including a second frame, a second base for supporting said second frame, a cylinder fixed to said second frame, a piston movable in said cylinder, a rod attached to said piston, and a weight support attached to said rod; a pipe connection between the weight support end of said control means cylinder and the grip attachment end of said hydraulic unit cylinder for transmission of fluid pressure therebetween, the diameter of the control means cylinder being less than that of the hydraulic unit cylinder; and friction reducing means for said hydraulic control means comprising a motor having its power shaft operably connected to said control means piston for rotation thereof, a platen having projecting ends rotatably mounted on said control means piston and having fixed connection to said motor, holding means fixed to said second frame for engaging said platen and restraining rotation thereof; and means between said holding means and platen for eliminating sliding friction therebetween on movement of said control means piston.

References Cited in the file of this patent

UNITED STATES PATENTS

| | | |
|---|---|---|
| 1,341,431 | Morrow | May 25, 1920 |
| 1,496,803 | Amsler | June 10, 1924 |
| 2,141,284 | Woock | Dec. 27, 1938 |
| 2,295,249 | Yates | Sept. 8, 1942 |
| 2,436,317 | Manjoine | Feb. 17, 1948 |
| 2,670,624 | Faris et al. | Mar. 2, 1954 |

FOREIGN PATENTS

| | | |
|---|---|---|
| 660,869 | Germany | June 4, 1938 |